US009531564B2

(12) United States Patent
Janakiraman et al.

(10) Patent No.: US 9,531,564 B2
(45) Date of Patent: Dec. 27, 2016

(54) SINGLE HOP OVERLAY ARCHITECTURE FOR LINE RATE PERFORMANCE IN CAMPUS NETWORKS

(71) Applicant: Cisco Technology, Inc., San Jose, CA (US)

(72) Inventors: Rajagopalan Janakiraman, Cupertino, CA (US); Anupama Ashok Lolage, Santa Clara, CA (US); Pags Krishnamoorthy, San Jose, CA (US); Sanjay Kumar Hooda, Cupertino, CA (US); Nalinaksh M. Pai, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 14/155,493

(22) Filed: Jan. 15, 2014

(65) Prior Publication Data

US 2015/0200848 A1    Jul. 16, 2015

(51) Int. Cl.
*H04L 12/741*    (2013.01)
*H04L 12/733*    (2013.01)
*H04L 12/46*    (2006.01)
*H04L 12/715*    (2013.01)
*H04L 12/721*    (2013.01)

(52) U.S. Cl.
CPC ....... *H04L 12/4633* (2013.01); *H04L 12/4641* (2013.01); *H04L 45/64* (2013.01); *H04L 45/66* (2013.01)

(58) Field of Classification Search
CPC ................................. H04L 45/74; H04L 45/20
USPC .......................................................... 370/392
See application file for complete search history.

(56) References Cited

U.S. PATENT DOCUMENTS

| 8,054,744 B1 * | 11/2011 | Bishara | H04L 47/2441 370/229 |
| 8,391,148 B1 * | 3/2013 | Wang | H04L 41/0803 370/235 |
| 8,520,540 B1 * | 8/2013 | Foschiano | H04L 43/0852 370/252 |

(Continued)

OTHER PUBLICATIONS

International Search Report & Written Opinion cited in International Application No. PCT/US2015/011378 mailed Apr. 8, 2015, 13 pgs.

(Continued)

*Primary Examiner* — Mark Rinehart
*Assistant Examiner* — Kenneth P Hunt
(74) *Attorney, Agent, or Firm* — Merchant & Gould P.C.

(57) ABSTRACT

Methods and systems are provided for detecting overlay end points which are a single physical hop away and employing a simplified overlay header instead of a regular overlay header for communications with the identified end points. The simplified overlay header may carry overlay protocol related forwarding and peer information and may be designed to carry locally significant forwarding information which avoids overlay lookup related overhead on encapsulation and decapsulation operations. The simplified overlay header may be handled in the same forwarding pipeline pass as the handling of the inner frame and may work across different forwarding engines. Upon detection of a single hop link/keepalive failure, the backup overlay (original overlay header) may be used for forwarding.

19 Claims, 12 Drawing Sheets

(56) References Cited

U.S. PATENT DOCUMENTS

| | | | | |
|---|---|---|---|---|
| 2001/0021189 | A1* | 9/2001 | Shiota | H04L 45/00 370/389 |
| 2004/0100951 | A1* | 5/2004 | O'neill | H04L 29/12009 370/389 |
| 2005/0265328 | A1* | 12/2005 | Bettink | H04L 45/7457 370/389 |
| 2006/0041682 | A1* | 2/2006 | Johnson | H04L 12/2856 709/242 |
| 2006/0233317 | A1* | 10/2006 | Coster | H04M 7/0075 379/45 |
| 2008/0310344 | A1* | 12/2008 | Krishnan | H04W 28/06 370/328 |
| 2012/0327936 | A1* | 12/2012 | Melman | H04L 69/18 370/392 |
| 2013/0058345 | A1* | 3/2013 | Kano | H04L 12/4633 370/392 |
| 2013/0322453 | A1* | 12/2013 | Allan | H04L 12/4662 370/395.53 |
| 2014/0029451 | A1* | 1/2014 | Nguyen | H04L 43/50 370/252 |
| 2014/0071990 | A1* | 3/2014 | Banavalikar | H04L 45/72 370/392 |
| 2014/0098713 | A1* | 4/2014 | Beckhardt | H04N 21/42684 370/256 |
| 2014/0254603 | A1* | 9/2014 | Banavalikar | H04L 69/03 370/401 |

OTHER PUBLICATIONS

Weiguo Hao Yizhou Li Huawei Technologies: "TRILL Integrated Routing and Bridging Solution; draft-hao-trill-irb-02.txt", TRILL Integrated Routing and Bridging Solution; DRAFT-HAO-TRILL-IRB-02.TXT, Internet Engineering Task Force, IETF; Standard Working Draft, Internet Society (ISOC) 4, Rue des Falaises CH-1205 Geneva, Switzerland, Jul. 11, 2013 (Jul. 11, 2013), pp. 1-10, XP015094447.

Perlman Intel Labs D Eastlake 3rd Huawei D Dutt S Gai Cisco Systems a Ghanwani Brocade R: "Routing Bridges (RBridges): Base Protocol Specification; rfc6325.txt", Routing Bridges (RBridges): Base Protocol Specification; RFC6325.TXT, Internet Engineering Task Force, IETF; Standard, Intern Et Society (ISOC) 4, Rue des Falaises CH-1205 Geneva, Switzerland, Jul. 22, 2011 (Jul. 22, 2011), pp. 1-99, XP015076094.

Maino V Moreno Cisco Systems M Smith Insieme Networks D Farinacci Lispers Net F:"Networking Virtualization Overlays Working Group; LISP WorkinY. Hertoghs Internet-Draft; draft-hertoghs-nvo3-lisp-control plane-unified-00.txt" , Networking Virtualization Overlays Working Group; LISP Workiny. Hertoghs Internet-Draft; DRAFT-HERTOGHS-NV03-LISP-CONTROLPLANE-UNIFIED-00.TXT, Internet Engineering Task Force, IETF; Standard Working Draft, Internet Society (ISOC) 4, Rue des, (Oct. 19, 2013).

* cited by examiner

| MAC ADDRESS | BRIDGE DOMAIN | L2 PORT/TUNNEL | TUNNEL ADJACENCY CONTENTS | FINAL PORT OF EXIT |
|---|---|---|---|---|
| MAC1 | 10 | Port 215 | | |
| MAC2 | 10 | LISP 210 to 220 | Source Address = Address of Switch 210; Destination Address = Address of Switch 220; UDP Destination Port = L2-LISP/vxLAN; Instance ID = 16k | Port 210-220 |
| MAC3 | 10 | LISP 210 to 230 | Source Address = Address of Switch 210; Destination Address = Address of Switch 230; UDP Destination Port = L2-LISP/vxLAN; Instance ID = 16k | Port 210-230 |

FIG. 3

| MAC ADDRESS | BRIDGE DOMAIN | L2 PORT/TUNNEL | TUNNEL ADJACENCY CONTENTS | FINAL PORT OF EXIT |
|---|---|---|---|---|
| MAC1 | 100 | LISP 220 to 210 | Source Address = Address of Switch 220; Destination Address = Address of Switch 210; UDP Destination Port = L2-LISP; Instance ID = 16k | Port 220-210 |
| MAC2 | 100 | Port 225 | | |
| MAC3 | 100 | LISP 220 to 230 | Source Address = Address of Switch 220; Destination Address = Address of Switch 230; UDP Destination Port = L2-LISP/vxLAN; Instance ID = 16k | Port 220-230 |

FIG. 4

| MAC ADDRESS | BRIDGE DOMAIN | L2 PORT/TUNNEL | TUNNEL ADJACENCY CONTENTS | FINAL PORT OF EXIT |
|---|---|---|---|---|
| MAC1 | 10 | LISP 230 to 210 | Source Address = Address of Switch 230; Destination Address = Address of Switch 210; UDP Destination Port = L2-LISP; Instance ID = 16k | Port 230-210 |
| MAC2 | 10 | LISP 230 to 220 | Source Address = Address of Switch 230; Destination Address = Address of Switch 220; UDP Destination Port = L2-LISP/vxLAN; Instance ID = 16k | Port 230-220 |
| MAC3 | 10 | Port 235 | | |

FIG. 5

| MAC ADDRESS | BRIDGE DOMAIN | L2 PORT/TUNNEL | TUNNEL ADJACENCY CONTENTS | FINAL PORT OF EXIT |
|---|---|---|---|---|
| MAC1 | 100 | Port 215 | | |
| MAC2 | 100 | Primary: LISP-210-220-SingleHop; Backup: LISP 210-220 | Ethertype = Single Hop Overlay; Protocol = L2-LISP; Peer = PeerB; Forwarding Domain = 100 | Port 210-220 |
| MAC3 | 100 | LISP 210 to 230 | Source Address = Address of Switch 210; Destination Address = Address of Switch 230; UDP Destination Port = L2-LISP; Instance ID = 16k | Port 210-230 |

FIG. 6

| MAC ADDRESS | BRIDGE DOMAIN | L2 PORT/TUNNEL | TUNNEL ADJACENCY CONTENTS | FINAL PORT OF EXIT |
|---|---|---|---|---|
| MAC1 | 100 | Primary: LISP-220-210-SingleHop; Backup: LISP 220-210 | Ethertype = Single Hop Overlay; Protocol = L2-LISP; Peer = PeerA; Forwarding Domain = 10 | Port 220-210 |
| MAC2 | 100 | Port 225 | | |
| MAC3 | 100 | LISP 210 to 230 | Source Address = Address of Switch 210; Destination Address = Address of Switch 230; UDP Destination Port = L2-LISP; Instance ID = 16k | Port 210-230 |

FIG. 7

| MAC ADDRESS | BRIDGE DOMAIN | L2 PORT/TUNNEL | TUNNEL ADJACENCY CONTENTS | FINAL PORT OF EXIT |
| --- | --- | --- | --- | --- |
| MAC1 | 10 | Port 215 | | |
| MAC2 | 10 | Primary: LISP 210-220; Backup: None | Source Address = Address of Switch 210; Destination Address = Address of Switch 220; UDP Destination Port = L2-LISP; Instance ID = 16k | Port 210-230 |
| MAC3 | 10 | LISP 210 to 230 | Source Address = Address of Switch 210; Destination Address = Address of Switch 230; UDP Destination Port = L2-LISP; Instance ID = 16k | Port 210-230 |

FIG. 8

SINGLE HOP OVERLAY ARCHITECTURE FOR LINE RATE PERFORMANCE IN CAMPUS NETWORKS

TECHNICAL FIELD

The present disclosure relates generally to overlay architectures and specifically to the improvement of line rate performance in campus networks.

BACKGROUND

Overlays have become commonly employed in next generation switching architectures to solve problems relating to Layer 2 ("L2") multipathing, L2 topology convergence, seamless mobility, and L2 extensions across IP cores. One downside to using an overlay (especially in the case of an IP based overlay) is resultant excessive network bandwidth usage due to the additional headers and degradation in hardware switching performance.

For example, the header over may be around 20% for Internet Mix ("IMIX") sized packets used in an IP based overlay such as Locator/ID Separation Protocol ("LISP") or other virtual LAN (vLAN) environments. Hardware performance degradation may be due to additional passes through the forwarding pipeline for overlay encapsulation and decapsulation processing.

On the decapsulation side, for an IP overlay, the pipeline resources to perform IP Source lookups on the outer header will require one forwarding pass through most of the forwarding pipelines to ensure IP packet header integrity and determine outer header decapsulation criteria. On the encapsulation side, one pass may be required to add the encapsulation header. A second pass may then be needed to bridge (route) the frame based on the outer encapsulation header.

When multiple overlay protocols are involved for the same frame in a single node, both the decapsulation and encapsulation overheads are added. For example, an incoming Layer 3 ("L3") LISP frame may go first through a decapsulation operation and subsequently go through a L3 and L2 forwarding lookups. The L3 LISP frame may then be encapsulated into a L2 LISP frame in an outgoing virtual vLAN.

There exists a need to take advantage of certain network topologies to decrease the level of overhead in such scenarios.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 3 illustrates a MAC table associated with embodiments of switch 210.

FIG. 4 illustrates a MAC table associated with embodiments of switch 220.

FIG. 5 illustrates a MAC table associated with embodiments of switch 230.

FIG. 6 illustrates an updated MAC table associated with embodiments of switch 210.

FIG. 7 illustrates an updated MAC table associated with embodiments of switch 220.

FIG. 8 illustrates the corresponding updated MAC table associated with switch 210 after the link between switch 210 and switch 220 fails.

DESCRIPTION OF EXAMPLE EMBODIMENTS

Figure 1:
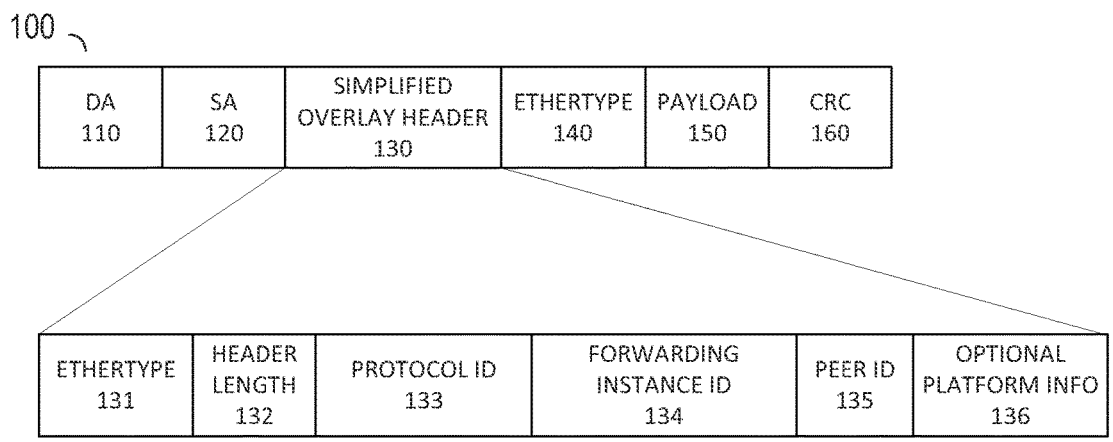
FIG. 1 illustrates an embodiment of a simplified overlay header.

Methods and systems are provided for detecting overlay end points which are a single physical hop away and employing a simplified overlay header instead of a regular overlay header for communications with the identified end points. The simplified overlay header may carry overlay protocol related forwarding and peer information and may be designed to carry locally significant forwarding information which avoids overlay lookup related overhead on encapsulation and decapsulation operations. The simplified overlay header may be handled in the same forwarding pipeline pass as the handling of the inner frame and may work across different forwarding engines. Upon detection of a single hop link/keepalive failure, the backup overlay (original overlay header) may be used for forwarding.

In many campus network deployments, the majority of the traffic can be referred to as north-south traffic (i.e., into and out of the data center). The overlays used for such north-south traffic may many times be single physical hops due to the nature of such campus topologies. Embodiments of the present disclosure take advantage of this majority use case found in campus environments through the use of a simplified single hop overlay header. This may be accomplished while retaining the original overlay header for the minority of multi-hop scenarios and for handling failures. This allows the overlay to remain intact while reducing the required processing overhead.

A link state based overlay protocol may be employed to manage the simplified single hop overlay headers and its related functions. For example, the simplified single hop overlay header may be comprised of locally relevant forwarding information in a more-generalized header format. The forwarding information encoded in the simplified single hop overlay header may help in forwarding decisions without requiring additional forwarding table lookups that may be required in prior art implementations.

While the present disclosure will be described mainly in a campus LISP environment, it should be understood that the embodiments described herein may be appropriate for other overlay architectures as well, including but not limited to vxLAN and Transparent Interconnection of Lots of Links ("TRILL"). For example, TRILL provides a similar use case in data centers where the gateway functionality is located in a spine switch. vxLAN may be used to extend the L2 network between a number of leaf switches as well as between a leaf and the spine (similar to north-south traffic as being a single physical hop in nature).

The most common case in the above-mentioned campus environments may be where L2 tunnels replace the spanning tree topology running between the access and distribution sides of the campus. Similarly, the L3-LISP tunnel may run between the core and distribution sides which are also single physical hops away from one another. For such single hop tunnels, the tunnel source may be derived from the incoming interface. The tunnel destination is unnecessary from the original header. Essentially the header is needed merely for carrying the network segment/vLAN ID of the packet.

Simplified Overlay Header

Embodiments of the present disclosure define a simplified overlay header with a special ethertype, wherein the simplified overlay header which may carry just enough information for the forwarding function to occur on the inner (original) frame without additional forwarding performance overhead associated with the decapsulation and encapsulation of the traditional header. FIG. 1 illustrates an embodiment of a simplified overlay header.

A simplified overlay header 130 may exist in a frame such as packet 100. Prior to simplified overlay header 130, packet 100 may contain information such as a destination address 110 and a source address 120. Simplified overlay header 130 may be comprised of a ethertype 131. For example ethertype 131 may indicate a 2 byte value indicating that the ethertype value corresponds to one of (Internetwork Packet Exchange ("IPX"), Bridge Protocol Data Unit ("BPDU"), Multiprotocol Label Switching ("MPLS")-Unicast, MPLS-Multicast, or another 16-bit hexadecimal value between 0x600 (1536) and 0xffff by which an ethertype can be identified.

Ethertype 131 may be followed by a one byte header length field 132. Header length field 132 may indicate that simplified overlay header 130 is 8 bytes. Alternatively, header length field 132 may indicate that simplified overlay header 130 is 12 bytes. When simplified overlay header 130 is 12 bytes, this may indicate that simplified overlay header 130 contains optional platform information 136. Optional platform information 136 may be reserved for future use to carry any other platform specific forwarding context information.

Following header length field 132 may be a one byte protocol ID field 133. Protocol ID field 133 may contain a value to allow multiple overlays to co-exist in the same link, such as L2-LISP, L3-LISP, TRILL, and vxLAN for example. In some embodiments, the protocol ID may be used along with a forwarding ID to derive a final forwarding context.

Forwarding instance ID field 134 may follow protocol ID field 133 and comprise 3 bytes of information. Forwarding instance ID field 134 may represent the local forwarding instance corresponding to the protocol instance ID. For example, forwarding instance ID field 134 may represent the logical interface ID. The logical interface ID may be used to denote a particular Virtual Routing and Forwarding ("VRF") or vLAN interface.

Following the forwarding instance ID field 134 may be a single byte peer field 135. Peer field 135 may be representative of a local identifier for an overlay peer who has been identified as being across a single physical hop. For example the value of peer field 135 may represent a Virtual Private LAN Services ("VPLS") peer. This peer ID may be used to locally learn and forward to an adjacency pointed to by the identified peer.

After simplified overlay header 130, packet 100 may contain the original ethertype field 140, the frame payload 150, and a cyclic redundancy check ("CRC") field 160. It should be noted that the simplified overlay header 130 may be used for regular unicast data traffic, for which the other fields in the typical tunnel use default values. For any exceptions and for handling L2 tunnel multicast traffic, the regular tunnel headers may be used between the same end points. In other words, the simplified overlay header 130 does not necessarily replace the regular tunnel header requirements in all scenarios.

Detecting Appropriate Overlay End Points

Embodiments of the present disclosure enforce a single hop overlay control protocol to detect overlay endpoints which are a single physical hop away from one another. The single hop overlay control protocol may also serve to exchange information related to overlay end point identifiers and forwarding instance mapping. This information may be used when constructing the simplified overlay header. The single hop overlay control protocol may be implemented as a new link state protocol. Alternatively, the single hop overlay control protocol may be tagged along with Link Layer Discovery Protocol ("LLDP")/Cisco Discovery Protocol ("CDP") with additional values to convey overlay information.

The single hop overlay control protocol may be used to exchange Type Length Values ("TLVs") with peer devices on behalf of the different overlay protocols running on a given system. The information received from the peer devices is fed back to the overlay protocols which are registered with the single hop control plane. The control packets received across a link may be locally consumed and not forwarded in this instance.

Information exchanged in the form of TLVs may include an overlay protocol id indicating the applicable overlay protocol. The information may further include a tunnel end point address. The address information may be in the form of an IP address or a Routing Bridge ("RBRIDGE") address. The address information may be used by the overlay protocol to determine if an overlay peer is a single hop away. For example, a switch may run through all of the overlay end points for the given overlay protocol and check to determine if each overlay end point address matches the tunnel end point address received via the TLV. If a match is successfully found, the single hop overlay control protocol may update the overlay encapsulation adjacency with the single hop adjacency formed based upon the instance and peer information received in the TLV.

Other information exchanged in embodiments of the present disclosure may include an overlay protocol Instance ID mapping to a local instance. For example, a protocol instance ID may be a 24-bit instance for LISP and vxLAN or a 12-bit instance with TRILL. The local instance ID may be a 24-bit value to be carried in the simplified overlay header and may be used for directly fetching the forwarding context like the bridge-domain or VRF-ID values based on the overlay protocol ID. The use of the local instance ID in the simplified overlay header may help by saving a mapping lookup function later in the forwarding pipeline. Otherwise, the mapping lookup may be required to map the protocol instance ID to the local forwarding domain.

Finally, the TLV information may also provide tunnel end point address to peer ID mapping information. Once the overlay control plane receives a TLV carrying the tunnel end point address as described above, the overlay control plane may assign a locally unique peer ID for the peering tunnel end point. Subsequently, the overlay control plane may send a TLV containing the mapping of the tunnel endpoint address to the peer ID back to the peer. The peer may use this peer ID to identify itself in the simplified overlay header. The assignment of the peer ID may be a function of the interface ID on which the peer was initially discovered. This information may enable source interface checks Reverse Path Forwarding ("RPF") based on the peer ID.

The mapping may be conveyed in range values to cover a large number of instance IDs as supported by the particular system. It should be understood that while the local instance ID may be conveyed as a 24-bit value, the range for the value may be determined by the number of forwarding contexts supported by the particular system.

Figure 2:
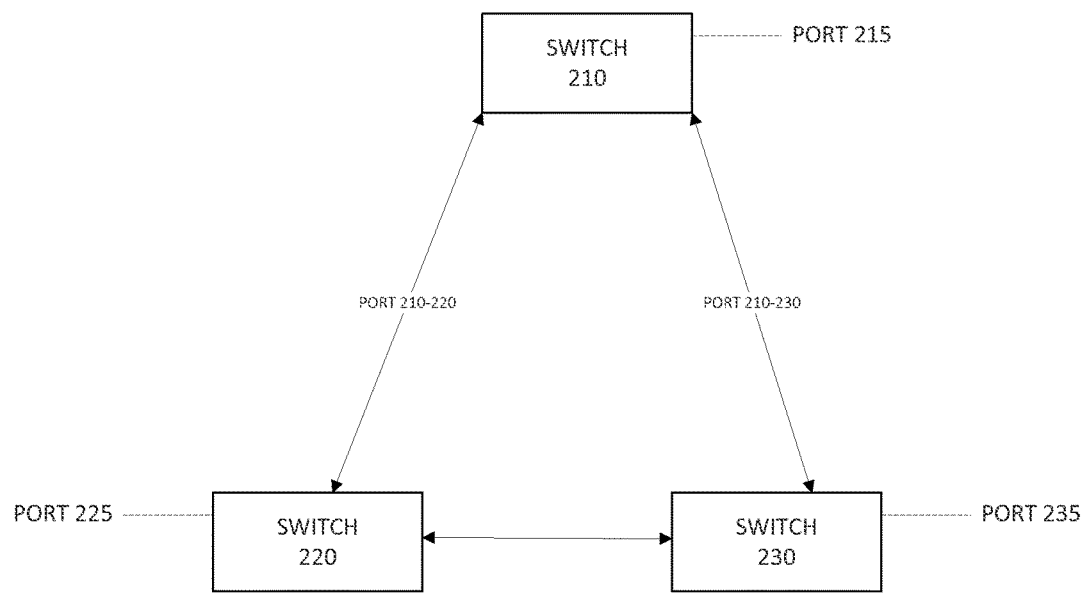
FIG. 2 illustrates a sample network scenario employing embodiments described herein.

FIG. 2 illustrates a sample scenario employing the principles described above. Switch 210 may be in communication with switch 220 and switch 230. Each of the switches may have a respective port, such as port 215, port 225, and port 235. The switches are connected through inter-switch links. For example, switch 210 communicates with switch 220 via port 210-220. Similarly, switch 210 communicates with switch 230 via port 210-230. The other switches communicate with one another in a similar fashion. Here, port 215 has a learned MAC=MAC1; port 225 has a learned MAC=MAC2; and port 235 has a learned MAC=MAC3. The inter-switch links may be L3 interfaces where L2-LISP/vxLAN tunnels may be running between each pair of switches to carry L2 frames.

FIG. 3 illustrates the MAC table associated with switch 210. For example, MAC address MAC1 may be associated with a bridge domain=10. The bridge domain may be representative of a logical interface that allows bidirectional flow of traffic between a L2 bridged network and a L3 routed network traffic. MAC1 may further be associated with the L2 Port/Tunnel=port 215. Correspondingly, MAC1 may not have a value for Tunnel Adjacency Contents or for a Final Port of Exit.

MAC address MAC2 may be associated with a same bridge domain=10. MAC2 may further be associated with the L2 Port/Tunnel=LISP 210-220. MAC2 may have multiple values for Tunnel Adjacency Contents. For example, the IP address of the source may be indicated as the IP address of switch 210. The IP address of the destination may be indicated as the IP address of switch 220. A User Datagram Protocol ("UDP") destination port may be indicated as a L2 LISP/vxLAN tunnel. Finally, an instance ID may be set at 16 k. The Final Port of Exit for MAC2 may be indicated as port 210-220. In some embodiments, this port may be resolved through an IP lookup on the IP address of switch 220.

MAC address MAC3 may again be associated with a same bridge domain=10. MAC3 may further be associated with the L2 Port/Tunnel=LISP 210-230. MAC3 may have multiple values for Tunnel Adjacency Contents. For example, the IP address of the source may be indicated as the IP address of switch 210. The IP address of the destination may be indicated as the IP address of switch 230. A User Datagram Protocol ("UDP") destination port may be indicated as a L2 LISP tunnel. Finally, an instance ID may be set at 16 k. The Final Port of Exit for MAC3 may be indicated as port 210-230.

FIG. 4 illustrates the MAC table associated with switch 220. For example, MAC address MAC1 may be associated with a bridge domain=100. MAC1 may further be associated with the L2 Port/Tunnel=LISP 220-210. MAC1 may have multiple values for Tunnel Adjacency Contents. For example, the IP address of the source may be indicated as the IP address of switch 220. The IP address of the destination may be indicated as the IP address of switch 210. A User Datagram Protocol ("UDP") destination port may be indicated as a L2 LISP tunnel. Finally, an instance ID may be set at 16 k.

MAC address MAC2 may be associated with a same bridge domain=100. MAC2 may further be associated with the L2 Port/Tunnel=port 225. Correspondingly, MAC2 may not have a value for Tunnel Adjacency Contents.

MAC address MAC3 may again be associated with a same bridge domain=100. MAC3 may further be associated with the L2 Port/Tunnel=LISP 220-230. MAC3 may have multiple values for Tunnel Adjacency Contents. For example, the IP address of the source may be indicated as the IP address of switch 220. The IP address of the destination may be indicated as the IP address of switch 230. A User Datagram Protocol ("UDP") destination port may be indicated as a L2 LISP tunnel. Finally, an instance ID may be set at 16 k.

FIG. 5 illustrates the MAC table associated with switch 230. For example, MAC address MAC1 may be associated with a bridge domain=10. MAC1 may further be associated with the L2 Port/Tunnel=LISP 230-210. MAC1 may have multiple values for Tunnel Adjacency Contents. For example, the IP address of the source may be indicated as the IP address of switch 230. The IP address of the destination may be indicated as the IP address of switch 210. A User Datagram Protocol ("UDP") destination port may be indicated as a L2 LISP tunnel. Finally, an instance ID may be set at 16 k.

MAC address MAC2 may be associated with a same bridge domain=10. MAC2 may further be associated with the L2 Port/Tunnel=LISP 230-220. MAC2 may have multiple values for Tunnel Adjacency Contents. For example, the IP address of the source may be indicated as the IP address of switch 230. The IP address of the destination may be indicated as the IP address of switch 220. A User Datagram Protocol ("UDP") destination port may be indicated as a L2 LISP tunnel. Finally, an instance ID may be set at 16 k.

MAC address MAC3 may again be associated with a same bridge domain=10. MAC3 may further be associated with the L2 Port/Tunnel=port 235. Correspondingly, MAC2 may not have a value for Tunnel Adjacency Contents.

With the scenario described in FIGS. 2-5, embodiments of the overlay control protocol may start to run on the inter-switch links, a number of TLVs may be exchanged. Switch 210 may provide the following TLVs to both switch 220 and switch 230:

Overlay Protocol=L2-LISP
Local Tunnel End Point=IP address of switch 210
Instance ID to Local Forwarding Domain mapping={16 k->10}
Peer ID mapping=unknown Upon receiving the TLVs from switch 210, switch 220 may inform the local L2-LISP control plane about the single hop peer it has discovered. Once switch 220 receives confirmation from the L2-LISP control plane about the validity of the peer (with an end point of the IP address of switch 210), a new peer ID may be created for the IP address of switch 210 at switch 220 (such as "peerA"). On receiving further messages from switch 210 on this or other links the "peerA" identifier may be reused. It should be noted that the "peerA" identifier only has significance in switch 220.

Switch 220 may provide the following TLVs back to switch 210:

Overlay Protocol=L2-LISP
Local Tunnel End Point=IP address of switch 220
Instance ID to Local Forwarding Domain mapping={16 k->100}
Peer ID mapping={IP address of switch 210, "peerA"}

Switch 210 may then verify the IP address of switch 220 with the L2-LISP control plane. Once the IP address is verified, an unused local peer ID, such as "peerB" may be generated and the following mapping is provided from switch 210 to switch 220:

Overlay Protocol=L2-LISP
Local Tunnel End Point=IP address of switch 210
Instance ID to Local Forwarding Domain mapping={16 k–>10}
Peer ID mapping={IP address of switch 220, "peerB"}

Switch 210 may then update the corresponding Tunnel Adjacency Contents from {IP address of source=IP address of switch 210; IP address of destination=IP address of switch 220; UDP destination port=L2-LISP, Instance=16 k} to {Ethertype=Single Hop Overlay; Overlay Protocol=L2-LISP; Peer=PeerA, Forwarding Domain=100}. For purposes of further description, this document may refer to the new Tunnel Adjacency Contents as "L2-LISP-A-B-SingleHop".

FIG. 6 illustrates the corresponding updated MAC table associated with switch 210. Specifically, the entry associated with MAC address MAC2 has been updated. MAC2 may still be associated with a same bridge domain=10. MAC2 may further be associated with new entries for the L2 Port/Tunnel, wherein a primary path P is associated with L2-LISP-A-B-SingleHop and a backup path is associated with L2-LISP-A-B. MAC2 may also have multiple updated values for Tunnel Adjacency Contents. For example, Ethertype may be indicated as Single Hop Overlay. The protocol may be indicated as L2-LISP. The Peer ID may be indicated as "PeerB". The forwarding domain may be indicated as 100. The Final Port of Exit for MAC2 may be indicated as port 210-220. In some embodiments, this port 210-220 may be indicative of the port on which overlay message are exchanged between switch 210 and switch 220.

FIG. 7 illustrates the corresponding updated MAC table associated with switch 220. Upon receiving the message from switch 210, switch 220 updates its corresponding L2-LISP adjacency from {IP address of source=IP address of switch 220; IP address of destination=IP address of switch 210; UDP destination port=L2-LISP, Instance=16 k} to {Ethertype=Single Hop Overlay; Overlay Protocol=L2-LISP; Peer=PeerB, Forwarding Domain=10}.

Specifically, the entry associated with MAC address MAC1 has been updated. MAC1 may now be associated with a bridge domain=100. MAC1 may further be associated with new entries for the L2 Port/Tunnel, wherein a primary path P is associated with L2-LISP-B-A-SingleHop and a backup path is associated with L2-LISP-B-A. MAC1 may also have multiple updated values for Tunnel Adjacency Contents. For example, Ethertype may be indicated as Single Hop Overlay. The protocol may be indicated as L2-LISP. The Peer ID may be indicated as "PeerA". The forwarding domain may be indicated as 10. The Final Port of Exit for MAC2 may be indicated as port 220-210. In some embodiments, this port 220-210 may be indicative of the port on which overlay message are exchanged between switch 220 and switch 210.

Handling Failovers

When the link between switch 210 and switch 220 fails (or when there are no keepalives received from the other end), the established adjacency will fall back to the backup adjacency as defined in the MAC tables. For example, at switch 210 the adjacency would change from the primary adjacency of L2-LISP-A-B-SingleHop to the backup adjacency of L2-LISP-A-B. In this case, the original overlay header will be used to route the frame. The frame may automatically pick up the alternate paths existing towards the designated tunnel end point. Embodiments of the overlay control protocol may use Bidirectional Forwarding Detection ("BFD") as one fast link failure detection mechanism.

FIG. 8 illustrates the corresponding updated MAC table associated with switch 210 after the link between switch 210 and switch 220 fails. Specifically, the entry associated with MAC address MAC2 has been updated again. MAC2 may still be associated with a same bridge domain=10. MAC2 may further be associated with new entries for the L2 Port/Tunnel, wherein a primary path P is associated with L2-LISP-A-B which was previously designated as the backup path. The backup path may now be specified as "None". The Tunnel Adjacency Content may revert to their initial settings For example, the IP address of the source may be indicated as the IP address of switch 210. The IP address of the destination may be indicated as the IP address of switch 220. A User Datagram Protocol ("UDP") destination port may be indicated as a L2 LISP/vxLAN tunnel. Finally, an instance ID may be set at 16 k. The Final Port of Exit for MAC2 may now be indicated as port 210-230 as port 220 no longer appears to be available. In some embodiments, this port may be resolved through an IP lookup on the IP address of switch 220, which now will resolve through switch 230.

Forwarding and Performance

Figure 9:
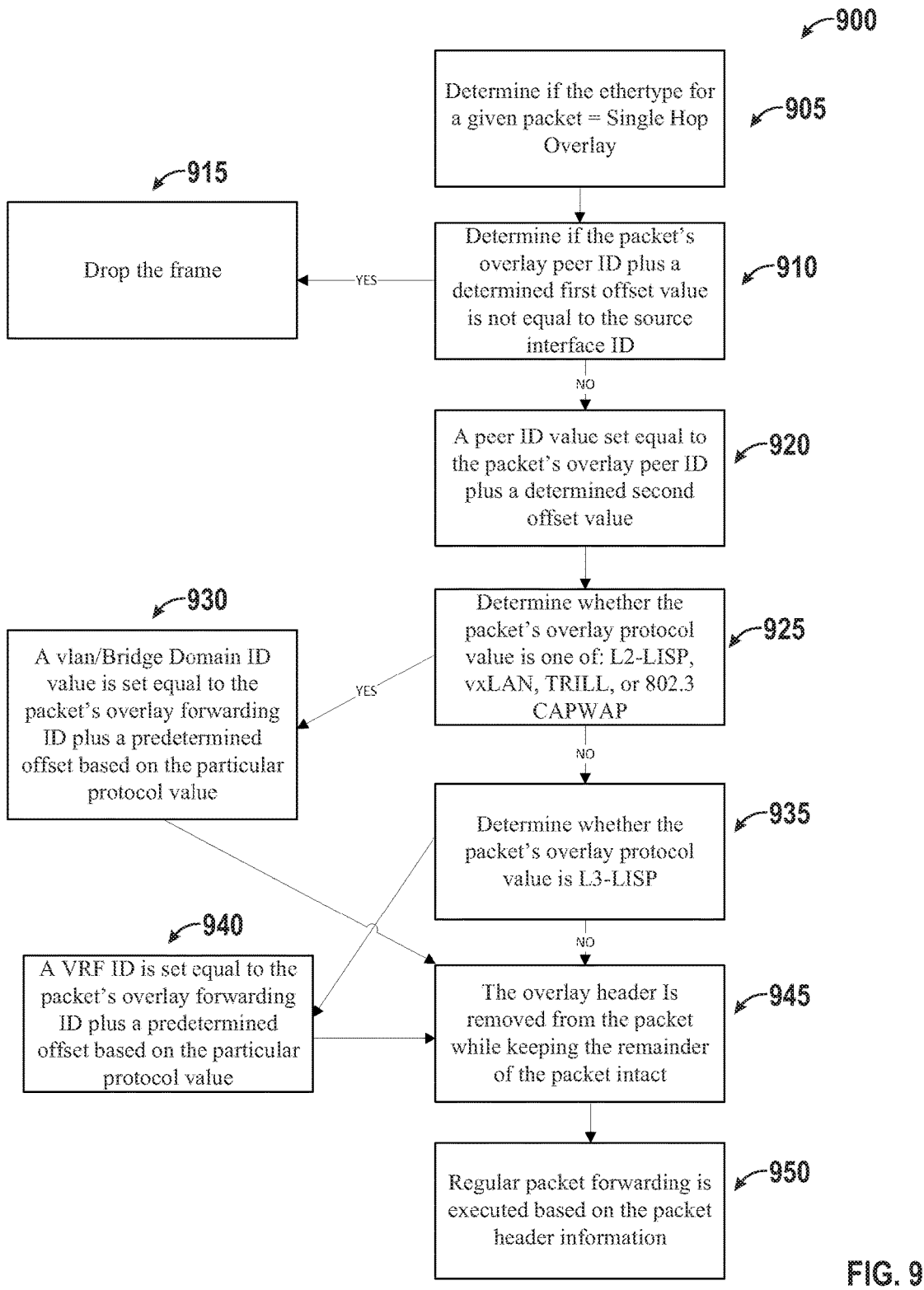
FIG. 9 is a flow chart illustrating embodiments of forwarding rule implementation.

Embodiments of the present disclosure may comprise a forwarding engine. The forwarding engine may be capable of pre-parsing the single hop ethertype value prior to going through the regular L2 and L3 parsing functions. The pre-parsing step may abide by certain rules as illustrated in the flow chart of FIG. 9. Method 900 may begin at step 905 where it is determined if the ethertype for a given packet=Single Hop Overlay. If the ethertype does correspond to Single Hop Overlay, method 900 proceeds to step 910 where it may be determined if the packet's overlay peer ID plus a determined first offset value is not equal to the source interface ID.

If at step 910, if it is if determined that the packet's overlay peer ID plus a determined first offset value is not equal to the source interface ID, method 900 may proceed to step 915 and drop the frame. Otherwise, method 900 may proceed to step 920 and a peer ID value may be set equal to the packet's overlay peer ID plus a determined second offset value. In some embodiments, the second offset value may be dependent upon the identified protocol ID value.

Method 900 may next proceed to step 925. At step 925, it may be determined whether the packet's overlay protocol value is one of: L2-LISP, vxLAN, TRILL, or 802.3 Control and Provisioning of Wireless Access Points ("CAPWAP"). If the packet's overlay protocol value is one of the previously listed values, method 900 may proceed to step 930 where a vlan/Bridge Domain ID value is set equal to the packet's overlay forwarding ID plus a predetermined offset based on the particular protocol value.

Method 900 may then proceed to step 935 where it may be determined whether the packet's overlay protocol value is L3-LISP. If this is the case, method 900 may proceed to step 940. At step 940 a VRF ID may be set equal to the packet's overlay forwarding ID plus a predetermined offset based on the particular protocol value.

Method 900 then may proceed to step 945. At step 945, the overlay header may be removed from the packet while keeping the remainder of the packet intact. In some embodiments, the single hop overlay header may always be removed on the ingress and never simply bridged as is. Method 900 may conclude at step 950, where regular packet forwarding is executed based on the packet header information.

Method 900 may be based in part on static offset values and conditions which do not require a lookup stage in the forwarding pipeline. Furthermore, method 900 may easily be handled in the pre-lookup parsing/classification stages in existing forwarding engines. In certain systems, such as Cisco's cat6k sup2T system, method 900 may be executed by Field Programmable Gate Array ("FPGA") equations.

Figure 10:
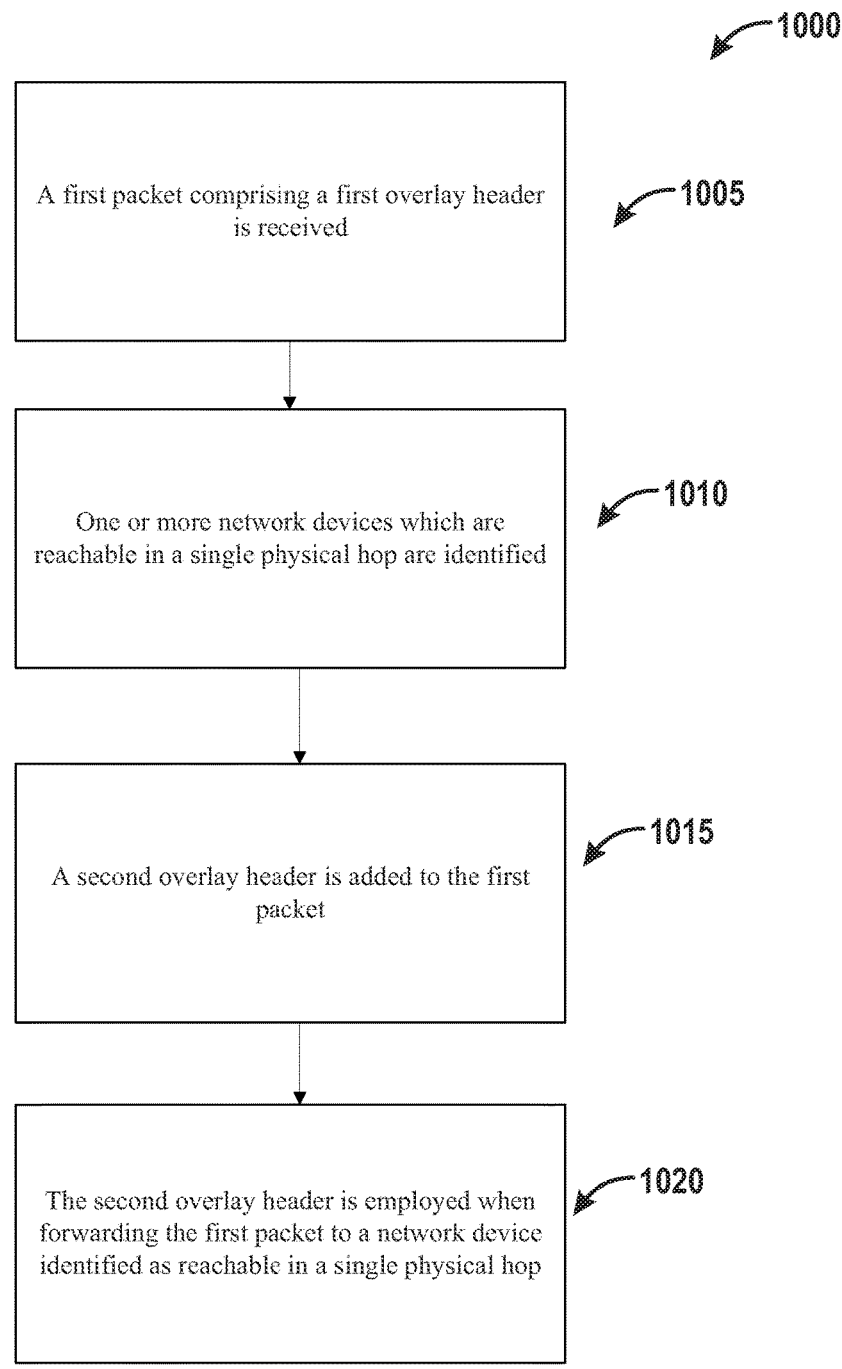
FIG. 10 is a flow chart illustrating certain embodiments of the present disclosure.

FIG. 10 is a flow chart illustrating certain embodiments of the present disclosure. Method 1000 may begin at step 1005 where a first packet comprising a first overlay header may be received. In some embodiments of the present disclosure, method 1000 may be employed on one or more switches in a campus network topology. The campus network may operate on a protocol defined by one of: L2-LISP, L3-LISP, TRILL, and vxLAN. Next, at step 1010, one or more network devices which are reachable in a single physical hop may be identified.

Method 1000 may proceed to step 1015. At step 1015, a second overlay header may be added to the first packet. In some embodiments, the second overlay header may comprise a new ethertype different than an ethertype employed by the first overlay header. The second overlay header may further comprise a protocol ID value used at least in part to derive a forwarding context. The second overlay header may further comprise a forwarding instance ID value used with the protocol ID value to derive the forwarding context.

The second overlay header may further comprises a peer ID value indicative of a network device identified as reachable in a single physical hop. In some embodiments of the present disclosure, the peer ID may be a text value, such as "peerA". The second overlay header may further comprise platform specific forwarding context information.

Method 1000 may conclude at step 1020 where the second overlay header may be employed when forwarding the first packet to a network device identified as reachable in a single physical hop. However, the first overlay header may be employed when forwarding the first packet to a network device not identified as reachable in a single physical hop.

Figure 11:
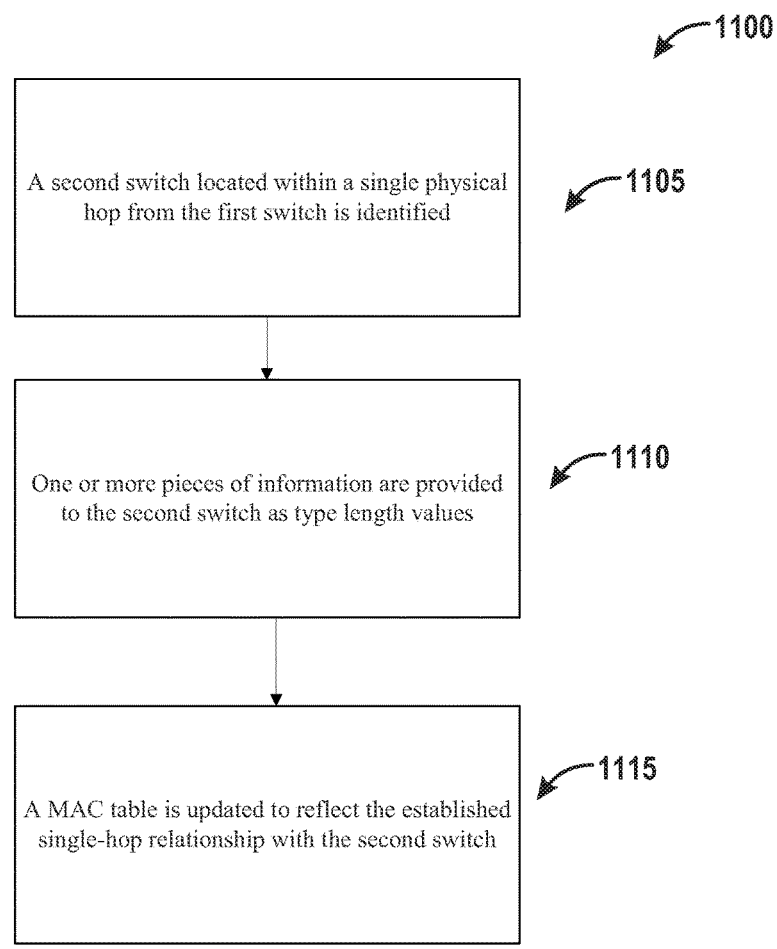
FIG. 11 is a flow chart illustrating certain embodiments of the present disclosure.

FIG. 11 is a flow chart illustrating certain embodiments of the present disclosure.

Method 1100 may start at step 1105 where a second switch located within a single physical hop from the first switch may be identified.

Method 1100 may proceed to step 1110 where one or more pieces of information may be provided to the second switch as type length values. The one or more piece of information can be used to establish a single-hop header for use when communicating packets between the first switch and the second switch. The one or more pieces of information may include an overlay protocol ID value, a tunnel end point address, a mapping of an overlay protocol instance ID to a local instance ID, and a mapping of the tunnel end point address to an assigned peer ID.

The first switch may be configured to determine whether the tunnel end point address matches an overlay end point address. If so, the first switch may update an overlay encapsulation adjacency with a single hop adjacency. In some embodiments of the present disclosure, during construction of the single-hop header, the first switch may include the local instance ID. The mapping of the tunnel end point address to an assigned peer ID may also be included in the single-hop header.

In some embodiments, method 1100 may conclude at step 1115 where a MAC table may be updated to reflect the established single-hop relationship with the second switch. A MAC table may be updated at both the first switch and the second switch.

Figure 12:
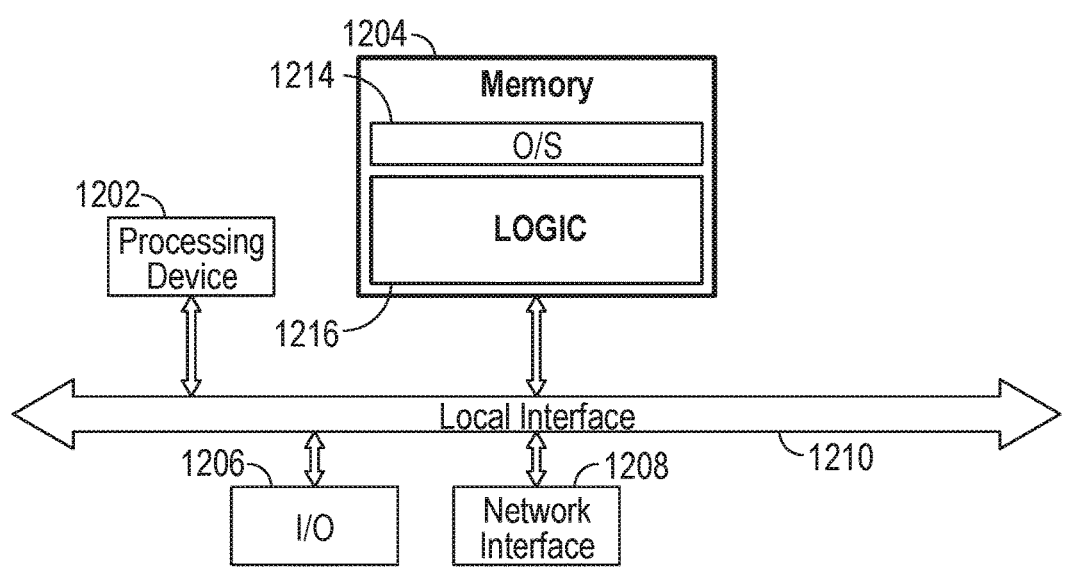
FIG. 12 is a system diagram of a network device operable with embodiments of the present disclosure.

FIG. 12 shows a network device, such as a switch that may employ embodiments of the present disclosure in greater detail. The network device may include at least a processing device 1202, a memory 1204, input/output (I/O) devices 1206, and a network interface 1208, each of which is communicatively coupled via a local interface 1210. The MAC tables may be located within memory 1204. Processing device 1202 may be a hardware device for executing software, particularly that which is stored in memory 1204. Processing device 1202 may be any custom made or commercially available processor, a central processing unit (CPU), an auxiliary processor among several processors associated with a content server, a semiconductor-based microprocessor (in the form of a microchip or chip set), a microprocessor, or generally any device for executing software instructions. The forwarding engine may be implemented by processing device 1202.

I/O devices 1206 may include input devices, for example but not limited to, a keyboard, mouse, scanner, microphone, etc. Furthermore, the I/O devices 1206 may also include output devices, for example but not limited to, a printer, display, etc.

Network interface 1208 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

Local interface 1210 may be, for example but not limited to, one or more buses or other wired or wireless connections. Local interface 1210 may have additional elements, which are omitted for simplicity, such as controllers, buffers (caches), drivers, repeaters, and receivers, to enable communications. Further, local interface 1210 may include address, control, and/or data connections to enable appropriate communications among the aforementioned components and provides the interface to communicate with processing device 1202.

In some embodiments, the network device may further be configured with an integrated storage device 1212 coupled to local interface 1210. Storage device 1212 may be configured to store a plurality of content chunks. In some embodiments, storage device 1212 may be used for storage of one or more MAC tables or mapping tables.

Memory 1204 may include a suitable operating system (O/S) 1214. Operating system 1214 essentially may control the execution of other computer programs, such as scheduling, input-output control, file and data management, memory management, and communication control and related services. Logic 1216 may include executable code to send TLVs to other network devices.

Memory 1204 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 1204 may incorporate electronic, magnetic, optical, semi-conductive, and/or other types of storage media. Note that memory 1204 may have a distributed architecture, where various components are situated remotely from one another, which can be accessed by the processing device 1202.

The software in memory 1204 may include one or more separate programs, each of which comprises an ordered listing of executable instructions for implementing logical functions. In the embodiment shown, the software in memory 1204 may include operating system 1214 and logic 1216, as explained above. Functionality of logic 1216 may be implemented using a single module, or distributed among a plurality of modules.

When logic 1216 is in operation, processing device 1202 may be configured to execute logic 1216 stored within memory 1204, to communicate data to and from memory 1204, and to generally control operations of logic 1216. Logic 1216 and O/S 1214, in whole or in part, but typically the latter, are read by processing device 1202, perhaps buffered within processing device 1202, and then executed.

The network device may include a communication interface suitable for enabling communication (e.g., TCP/IP) with other network devices, and for receiving and processing forwarding requests to provide overlay communication services to a switch. For instance, communication interface may be of a type suitable for communication over an IP network, a coaxial cable network, an HFC network, and/or wireless network, among others.

A communications port (or ports) may further be included in the network device for receiving information from and transmitting information to other devices. For instance, a communication port may feature USB (Universal Serial Bus), Ethernet, IEEE-1394, serial, and/or parallel ports, etc. In addition, a communications port may be configured for home networks (e.g., HPNA/MoCA, etc.).

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit the invention to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

We claim:

1. A method comprising:
   determining that an ethertype for a packet equals single hop overlay;
   determining that a first peer identity associated with the packet plus a determined first offset value is not equal to an interface ID associated with a source when the ethertype for the packet equals the single hop overlay;
   setting a second peer ID value equal to the first peer ID associated with the packet plus a determined second offset value;
   setting a virtual local area network (VLAN) domain ID value equal to an overlay forwarding ID associated with the packet based on a protocol value as one of: a layer-2 locator/ID separation protocol (L2-LISP), a virtual extensible local area network (vxLAN) protocol, a transparent interconnection of lots of links (TRILL) protocol, or a control and provisioning of wireless access point (CAPWAP) protocol;
   setting a virtual routing and forwarding (VRF) ID equal to the packet's overlay forwarding ID plus a third offset based on the protocol value being equal to layer-3 LISP (L3-LISP); and
   removing an overlay header from the packet while keeping the remainder of the packet intact.

2. The method of claim 1, wherein setting the second peer ID value comprises setting the second peer ID value indicative of at least one network device identified as reachable in a single physical hop.

3. The method of claim 2, wherein setting the second peer ID value comprises setting the second peer ID value indicative of a local identifier for the at least one network device identified as reachable in the single physical hop.

4. The method of claim 3, wherein setting the local identifier comprises setting the local identifier representing a virtual private LAN service (VPLS) peer.

5. The method of claim 1, wherein determining that the ethertype for the packet equals the single hop overlay comprises determining that the ethertype for the packet equals the single hop overlay for a data center in a campus network deployment.

6. The method of claim 1, wherein determining that the ethertype for the packet equals the single hop overlay comprises determining that the ethertype for the packet equals the single hop overlay in a data traffic into and out of a data center in a campus network deployment.

7. The method of claim 1, wherein determining that the ethertype for the packet equals the single hop overlay comprises determining that the ethertype for the packet equals the single hop overlay in a simplified header of a data packet.

8. An apparatus comprising:
a memory; and
a processor configured to execute instructions stored in the memory, the instructions comprising:
  receiving a packet at a network switch;
  determining that an ethertype for the packet equals a single hop overlay;
  determining that a first peer identity (ID) associated with the packet is not equal to an interface ID associated with a source when the ethertype for the packet equals the single hop overlay;
  setting a second peer ID value in place of the first peer ID;
  setting a virtual local area network (VLAN) domain ID value equal to an overlay forwarding ID associated with the packet based on a protocol value, the protocol value representing one of the following: a layer-2 locator/ID separation protocol (L2-LISP), a virtual extensible local area network (vxLAN) protocol, a transparent interconnection of lots of links (TRILL) protocol, and a control and provisioning of wireless access point (CAPWAP) protocol;
  setting a virtual routing and forwarding (VRF) ID equal to the packet's overlay forwarding ID plus an offset, the offset being based on the protocol value; and
  removing an overlay header from the packet while keeping the remainder of the packet intact.

9. The apparatus of claim 8, wherein the instructions for setting the peer ID further comprising instructions for setting the peer ID in a single byte peer field.

10. The apparatus of claim 8, wherein the instructions for setting the VRF ID further comprises instructions for setting the VRF ID in a three byte VRF ID field.

11. The apparatus of claim 8, wherein the protocol value is a two byte value.

12. A system comprising:
a network switch, the network switch being operative to:
  receive a packet at a network switch;
  set a simplified header for the received packet, wherein the network switch being operative to set the simplified header comprises the network switch being operative to:
    set an ethertype value in an ethertype field for the packet, the ethertype value indicating one of the following: a layer-2 locator/ID separation protocol (L2-LISP), a virtual extensible local area network (vxLAN) protocol, a transparent interconnection of lots of links (TRILL) protocol, and a control and provisioning of wireless access point (CAPWAP) protocol;
    set a header length in a header length field, the header length indicating a length of the simplified header;
    set a forwarding instance identity (ID) in a forwarding instance ID field, the forwarding instance ID representing a logical interface ID used to denote a at least one of the following: a virtual routing and forwarding (VRF) interface and a virtual local area network (VLAN) interface; and
    set a peer ID in a peer ID field, the peer ID representing a local identifier for an overlay peer which has been identified as being across a single physical hop.

13. The system of claim 12, wherein the network switch is further configured to set a protocol ID in a protocol ID field, the protocol ID containing a value to allow multiple overlays to co-exist in a same link.

14. The system of claim 12, wherein the value of the peer field represents a virtual private LAN service (VPLS) peer.

15. The system of claim 12, wherein the network switch is a distribution switch.

16. The system of claim 12, wherein the length of the simplified header is one of the following: eight bytes and twelve bytes.

17. The system of claim 12, wherein the header length field follows the ethertype field.

18. The system of claim 12, wherein the forwarding instance ID field length field follows the header length field.

19. The system of claim 12, wherein the peer ID field length field follows the forwarding instance ID field.

* * * * *